United States Patent Office 3,112,538
Patented Dec. 3, 1963

3,112,538
PROCESSES FOR BINDING PARTICULATE
SOLID MATERIALS
Harold Garton Emblem, Grappenhall, England, assignor to Philadelphia Quartz Company, Philadelphia, Pa., a corporation of Pennsylvania
No Drawing. Filed Mar. 10, 1960, Ser. No. 13,987
Claims priority, application Great Britain Mar. 19, 1959
7 Claims. (Cl. 22—193)

This invention relates to processes for binding particulate solid materials, more particularly refractory materials, in which processes the material is mixed with a liquid binder capable of being hydrolysed and gelled to silica gel, the mixture shaped to the form desired and the binder set by hydrolysis and gelation to silica gel.

It has now been found that of the class of aminoalkyl silicates, that is to say silicates in which alkyl groups attached by oxygen to the silicon atoms carry amino groups, there are members which can be readily hydrolysed and gelled to silica gel by merely mixing them with water and which are particularly advantageous when used as the liquid binder in processes of the kind described above.

Accordingly the present invention provides a process for binding a particulate refractory material in which the refractory material is mixed with a liquid binder, the mixture shaped to the form desired and the binder set by hydrolysis and gelation to silica gel, wherein the binder is an aminoalkyl silicate. To determine whether a particular aminoalkyl silicate can be used in the process of the invention it is necessary simply to determine whether the silicate can be mixed with water to give a composition which will set to a gel.

The silicates that may be used in the process of the invention can be orthosilicates of the general formula $Si(OR)_4$ where the group R is an alkyl group carrying an amino group; they can be polysilicates in which some of the valencies of the silicon atoms are satisfied by such aminoalkyl groups and others by oxygen which is attached to another silicon atom; or they can be mixtures of orthosilicates and polysilicates.

Preferably the aminoalkyl groups, which may be the same or different, are derived from an aminoalcohol of the formula

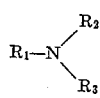

where $R_1$ is a linear or branched hydroxyalkyl group containing not more than 5 carbon atoms and containing one or two hydroxyl groups; $R_2$ and $R_3$, which may be the same or different, are hydrogen or linear or branched hydroxyalkyl groups containing not more than 5 carbon atoms and containing one hydroxyl group; the total number of hydroxyl groups of the alcohol being not greater than 3. More preferred silicates are those in which the aminoalkyl groups are derived from an alcohol of the above formula in which $R_1$ is a heydroxyalkyl group of 2 to 4 carbon atoms and contains one hydroxyl group, and $R_2$ and $R_3$ are the same or different and are hydrogen or hydroxyalkyl groups containing 1 to 4 carbon atoms and containing one hydroxyl group. If $R_2$ is a hydroxyalkyl group, it preferably contains only 2 or 3 carbon atoms and $R_3$ is then preferably hydrogen.

The silicate may contain a substantial proportion of linear or branched alkoxy groups which are not substituted by amino groups and these preferably contain not more than 5 carbon atoms, such as methoxy, ethoxy, propoxy and butoxy groups; in such instances, for orthosilicates, there may be only one amino-substituted ester group per silicon atom.

The aminoalkyl silicates can be prepared by ester interchange processes from alkyl silicates by which the organic groups, or some of them are replaced by aminoalkyl groups. Thus the methyl or ethyl groups of methyl or ethyl orthosilicates can be partly or wholly replaced by aminoalkyl groups by refluxing the esters at an elevated temperature with an appropriate amount of a primary, secondary or tertiary amino alcohol and removing by distillation the methyl and ethyl alcohols as they are formed. In general, the aminoalcohol used in the ester interchange process is of higher boiling point than the alcohol which it replaces so that the replaced alcohol can easily be removed as it is formed, while unreacted aminoalcohol remains to continue replacement. Similar interchange processes can be carried out with the corresponding polysilicates or mixtures of them with the orthosilicates.

When an ester interchange reaction is carried out with only partial replacement of alkyl groups in an alkyl silicate by aminoalkyl groups, the mixed esters formed cannot be isolated by distillation, for disproportionation supervenes and mixtures of esters are obtained, having indefinite boiling point ranges.

When ester interchange is effected between an alkyl silicate and a dihydric aminoalcohol, the reactants are preferably employed in the molecular ratio of 1:1 to ensure that gelation does not occur as the reaction proceeds. When employing orthosilicates, a minimum of 1 mol. of alcohol per mol. of orthosilicate should be removed in order to ensure that no unreacted orthosilicate remains. It is preferred, in such cases, to avoid gelation and to give a fluid reaction product, to remove not more than 1.75 mol. of alcohol when both hydroxyl groups are on the same carbon chain and to remove not more than 1.25 mol. of alcohol when the hydroxyl groups are on different carbon chains. In the case of ester interchange reactions between an alkyl silicate and a trihydric aminoalcohol, the reactants are preferably employed in the molecular ratio of 1 mol. of silicate to ⅔ mol. of alcohol; 1 to 1.25 mol. of alcohol are preferably removed when employing orthosilicates.

The extent of the desired replacement of the alkyl groups of the alkyl silicate whether the silicate be orthosilicate, polysilicate or a mixture of orthosilicate and polysilicate, may be expressed in terms of the number of aminoalkyl groups to be present in the final product per silicon atom. For any particular silicate material the quantity of aminoalcohol required to give a predetermined degree of replacement can be calculated from the silica content of the material concerned. Thus, for example, if it is required to produce a product in which there is one aminoalkyl group per silicon atom, then the reaction components are employed in the proportion of 1 g. mol. of aminoalcohol to that weight of silicate which contains 1 g. mol. of silica.

Silicates having the desired rate of setting for any particular application can be obtained by, inter alia, an appropriate choice of the number of aminoalkyl groups introduced per silicon atom; in general, the rate of hydrolysis and gelation increases as the number of aminoalkyl groups per silicon atom increases.

The optimum number of aminoalkyl groups to be introduced into a particular alkyl silicate to give a product having the desired hydrolysis and gelation behaviour can be readily determined by simple experiment; this number will usually vary from one silicate to another. It will be found that for most purposes the number of aminoalkyl groups introduced into a polysilicate containing not more than 20% of orthosilicate will be at least 0.1 per silicon atom and will generally be higher than this value. For larger orthosilicate contents this minimum value will be correspondingly higher and will approach the value of one amino group per silicon atom with increase in the proportion of orthosilicate.

In binding the particulate refractory material, the material to be bound may be mixed with an appropriate quantity of the silicate and water, shaped to the form desired and the composition allowed to set; there is no need to use a solvent for the silicate and water, although in some cases, where the silicate and water are immiscible, a mutual solvent is of assistance. The silicates are especially valuable as binders for refractory materials in the manufacture of refractory moulds for the precision casting of metals. The silicates can be used for this purpose by mixing them with fine refractory powders to give slurries which are then shaped around an expendable pattern, for example of wax, of the article to be made, such as by dipping the pattern into the slurry, to form a thin primary investment coating which ultimately provides an accurate and smooth surface in the final mould; such coated patterns can subsequently be invested by the normal methods of the investment process, for instance using coarse refractory powders made into a slurry with acid hydrolysed ethyl silicate solution. In some cases water can be omitted from the slurry of the aminoalkyl silicate and refractory powder and the coated pattern can be allowed to stand to take up atmospheric moisture to set the coating. Furthermore, a shell mould can be made by providing a wax pattern with a series of coatings of a mixture of aminoalkyl silicate and refractory and, if necessary, water, each coating being set and allowed to harden at least partially before the next is provided, and the coatings being dusted with coarse refractory material between successive coatings, if desired; the coatings then being hardened and the pattern removed. To speed up the process the dusting may be effected with a moistened coarse refractory powder.

The invention is illustrated by the following examples of which Examples 1 to 8 described the preparation of aminoalkyl silicates and Examples 9 to 17 describe processes employing aminoalkyl silicates as binders for refractory materials.

Example 1

A mixture of tetraethyl orthosilicate (208 g., 1 mol.) and monoethanolamine (244 g., 4 mols.) was heated and maintained under gentle reflux by a fractionating column allowing the distillation of ethyl alcohol as it was formed. After 9 hours the theoretical quantity of alcohol for replacement of all the ethyl groups had been collected. The product was then distilled at 1 mm. mercury pressure, giving tetra-beta-aminoethyl orthosilicate as a liquid of boiling point 205° C./1 mm. and refractive index $n_D^{20}$ 1.469. Its equivalent weight was determined by titration with acid as 67.3 (required 67).

Example 2

A mixture of an ethyl silicate containing polysilicates (238 g.) and monoethanolamine (122 g., the equivalent of half the ethyl groups in the silicate) was heated and maintained under gentle reflux by a fractionating column allowing distillation of the replaced ethyl alcohol. During 3 hours the theoretical quantity of alcohol was recovered, leaving an ethyl beta-aminoethyl silicate containing polysilicates and equal proportions of ethyl and beta-aminoethyl groups. Titration with acid showed it had an equivalent of 142 (required 149). The ester was miscible with water; an aqueous mixture containing 10% of water gelled in 15 seconds.

Example 3

2-amino-butan-1-ol orthosilicate was prepared by reacting in the manner described in Example 1, 1 g. mol. of ethyl orthosilicate with 4 g. mols. of 2-amino-butan-1-ol, and recovering 4 g. mols. of ethyl alcohol during 8 hours.

Example 4

3-amino-propan-1-ol orthosilicate was prepared by reacting in the manner described in Example 1, 1 g. mol. of ethyl orthosilicate with 4 g. mols. of 3-amino-propan-1-ol, and recovering 4 g. mols. of ethyl alcohol, during 4 hours. The resulting product had a silica content of 17.9%. (3-amino-propan-1-ol orthosilicate has a theoretical silica content of 18.5%.)

Example 5

112.8 g. of n-amyl orthosilicate and 31.5 g. of diethanolamine were reacted, in the manner described in Example 1, 28.1 g. of n-amyl alcohol being recovered which corresponds to the removal of 1.06 mol. of amyl alcohol per mol. of orthosilicate. The product had a silica content of 14.2%. 10 ml. of the product when mixed with 2 ml. of water gelled in 30 seconds.

Example 6

104.2 g. of ethyl orthosilicate, and 52.6 g. of diethanolamine were reacted, in the manner described in Example 1, 23 g. of ethyl alcohol being recovered which corresponds to the removal of 1.0 mol. of ethyl alcohol per mol. of orthosilicate. The reaction product had a silica content of 21%.

Example 7

104.2 g. of ethyl orthosilicate and 49.8 g. of triethanolamine were reacted in the manner described in Example 1, 23 g. of ethyl alcohol being recovered. The reaction product had a silica content of 20%.

Example 8

64 g. of normal butyl orthosilicate and 24 g. of 2-amino-2-ethyl-propan-1,3-diol were reacted as described in Example 1, 27.4 g. of normal butyl alcohol being recovered; these quantities correspond to 1 mol. normal butyl orthosilicate, 1 mol. amino alcohol and 1.75 mol. normal butyl alcohol recovered. The aminoalkyl silicate so prepared had a silica content of 19.5%. A mixture of 5 ml. of the aminoalkyl silicate with 1 ml. of water gelled in 30 seconds.

Example 9

The ester product of Example 2 (50 g.) was mixed with silica flint (50 g.) all passing a 170 mesh B.S.S. sieve, that is to say of particle size such that it all passed a British Standard sieve of 170 mesh (see British Standard Specification 410 of 1943). The mixture was used to provide a primary investment coating on a wax pattern, and the coating dusted with coarse quartz powder. The coated pattern was then allowed to stand exposed to atmospheric moisture, when the coating rapidly set.

Example 10

A primary investment coating composition for wax patterns was prepared by adding dry silica powder to 2-amino-butan-1-ol orthosilicate prepared as described in Example 3, in the proportion of 20 g. orthosilicate to 15 g. of silica powder all passing a 170 mesh B.S.S. sieve. This composition wetted wax patterns satisfactorily, the coated pattern requiring 24 to 36 hours to harden. Dusting the coated pattern with sillimanite of such particle size that it passes a 30 mesh I.M.M. sieve (a sieve of the Institute of Mining and Metallurgy specification—see an appendix to British Standard 410 of 1943) but is retained on an 80 mesh I.M.M. sieve before drying, is desirable, as this helps the secondary investment to key to the coating.

*Example 11*

A primary investment coating composition for wax patterns was prepared by adding dry silica powder to 3-amino-propan-1-ol orthosilicate prepared as described in Example 4 in the proportion of 20 g. of orthosilicate to 15 g. of silica powder all passing a 170 mesh B.S.S. sieve. This composition wetted wax patterns satisfactorily, the coated patterns requiring 36 to 48 hours to harden. Dusting the coated patterns with sillimanite of such particle size that it passes a 30 mesh I.M.M. sieve but is retained on an 80 mesh I.M.M. sieve before fully hardening, is desirable. Hardening of the coating can be speeded up by employing dampened sillimanite.

*Example 12*

A primary investment coating composition for wax patterns was prepared by adding dry silica powder to the product of Example 5, in the proportion of 20 g. of product to 15 g. of silica powder, all passing a 170 mesh B.S.S. sieve. This composition wetted wax patterns satisfactorily. A wax pattern was dipped in the composition, then immediately dusted with sillimanite of such particle size that it passed a 30 mesh I.M.M. sieve but was retained on an 80 mesh I.M.M. sieve. The coated pattern hardened after standing for 24 hours.

*Example 13*

A ceramic shell mould was prepared as follows. A wax pattern was dipped into a coating composition prepared as described in Example 12, and dusted with dry sillimanite, of such particle size that it passed a 30 mesh I.M.M. sieve but was retained on an 80 mesh I.M.M. sieve. The coating was allowed to harden for one hour. The coated pattern was again dipped into the coating composition then immediately dusted with dampened sillimanite of the same particle size as that used in the previous dusting. When the coating had hardened, requiring 15 minutes, the dipping and dusting sequence was repeated until a total of four dips and dustings with dampered material had been applied. 15 minutes after the last dusting operation, the coated pattern was again dipped in the coating composition, and the ceramic shell mould resulting was allowed to harden for 24 hours before removal of the wax pattern.

*Example 14*

A coating composition for wax patterns was prepared by adding dry silica to the reaction product of Example 6, in the proportion of 20 g. of reaction product to 15 g. of silica powder, all passing a 170 mesh B.S.S. sieve.

A ceramic shell mould was prepared as follows from the coating composition. A wax pattern was dipped in the coating composition and dusted with dry calcined kaolin powder. The coating was allowed to harden for one hour and after this time the coated pattern was again dipped into the coating composition then immediately dusted with dampened calcined kaolin powder. When the coating had hardened, requiring about 10 minutes, the dipping and dusting sequence was repeated, until a total of four dips and dustings with dampened material had been applied. 15 minutes after the last dusting operation the coated pattern was again dipped into the coating composition, and the ceramic shell mould resulting was allowed to harden for 24 hours before removal of the wax pattern.

*Example 15*

A coating composition for wax patterns was prepared by adding dry silica to the reaction product of Example 7, in the proportion of 20 g. of reaction product to 15 g. of silica powder, all passing a 70 mesh B.S.S. sieve.

A ceramic shell mould was prepared as follows from the coating composition. A wax pattern was dipped in the coating composition and dusted with dry calcined kaolin powder. The coating was allowed to harden for 90 minutes, and after this time the coated pattern was again dipped in the coating composition then immediately dusted with dampened calcined kaolin powder. When the coating had hardened, requiring about 30 minutes, the dipping and dusting sequence was repeated, until a total of four dips and dustings using dampened material had been applied. 30 minutes after the last dusting operation, the coated pattern was again dipped into the coating composition, and the ceramic shell mould resulting was allowed to harden for 24 hours before removal of the wax pattern.

*Example 16*

A coating composition was prepared by adding dry silica powder, all passing a 170 mesh B.S.S. sieve, to the aminoalkyl silicate prepared as described in Example 8 in the proportion of 15 g. of silica powder to 25 g. of the aminoalkyl silicate. This composition was used as a primary investment coating for wax patterns by dipping a wax pattern into the coating composition and dusting calcined kaolin powder onto the coated pattern. The coating set hard in about 45 minutes.

*Example 17*

A ceramic shell mould was prepared by dipping a wax pattern into the coating composition prepared as described in Example 16, and dusting the coated pattern with dampened calcined kaolin powder. After a five minute interval, the sequence of dipping and dusting was repeated. These sequences were repeated, until the pattern had been given a total of 5 dips and 5 dustings. Five minutes after the last dusting operation the coated pattern was again dipped into the coating composition and the ceramic shell mould resulting was allowed to harden for 24 hours before removal of the wax pattern.

What is claimed is:

1. A process for binding a particulate refractory material, which comprises the steps of mixing the refractory material with a liquid binder constituted by an aminoalkyl silicate capable of being hydrolysed and gelled by water to silica gel, shaping the mixture to the form desired and setting the binder by hydrolysis and gelation to silica gel.

2. A process as claimed in claim 1 in which the aminoalkyl groups of the silicate are derived from an alcohol of the formula

where $R_1$ is selected from the group consisting of linear and branched hydroxyalkyl groups containing not more than 5 carbon atoms and at least one hydroxyl group but not more than two hydroxyl groups; $R_2$ and $R_3$ are selected from the group consisting of hydrogen and linear and branched hydroxyalkyl groups containing not more than 5 carbon atoms and one hydroxyl group; the total number of hydroxyl groups of the alcohol being not greater than 3.

3. A process as claimed in claim 2 in which the aminoalkyl groups of the silicate are derived from an alcohol of the group consisting of monoethanolamine, diethanolamine and triethanolamine.

4. In a process for the preparation of a primary investment coating on an expendable pattern in the manufacture of moulds for the casting of metals, in which process the pattern is provided with a thin coating of a mixture of fine refractory material and a liquid binder in the form of a slurry, and the binder set by hydrolysis and gelation to silica gel; the step of employing as the binder an aminoalkyl silicate.

5. In a process for the preparation of shell moulds for the casting of metals in which an expendable pattern is provided with a series of coatings of a mixture of fine refractory material and a liquid binder in the form of a slurry, each coating being set and allowed to harden at least partially before the next is applied, the coatings then being finally hardened and the pattern removed; the step of employing as the binder an aminoalkyl silicate.

6. A process according to claim 1 wherein setting of the binder by hydrolysis and gelation to silica gel is accomplished by exposure to atmospheric moisture.

7. A process according to claim 4 wherein setting of the binder by hydrolysis and gelation to silica gel is accomplished by exposure to atmospheric moisture.

References Cited in the file of this patent

UNITED STATES PATENTS

| | | |
|---|---|---|
| 2,027,932 | Ray | Jan. 14, 1936 |
| 2,660,538 | Emblem | Nov. 24, 1953 |
| 2,885,419 | Beinfest et al. | May 5, 1959 |
| 2,895,934 | Archer et al. | July 21, 1959 |

FOREIGN PATENTS

| | | |
|---|---|---|
| 1,066,582 | Germany | Oct. 8, 1959 |